United States Patent [19]

Whitmarsh

[11] Patent Number: 4,457,561

[45] Date of Patent: Jul. 3, 1984

[54] COVERS FOR THE WHEELS OF MOTOR CARS

[75] Inventor: Herbert F. Whitmarsh, High Barnet, England

[73] Assignee: Initial Plastics Ltd., High Barnet, England

[21] Appl. No.: 507,209

[22] Filed: Jun. 23, 1983

Related U.S. Application Data

[63] Continuation of Ser. No. 232,149, Feb. 6, 1981, abandoned.

[30] Foreign Application Priority Data

Mar. 31, 1980 [GB] United Kingdom ................. 8010790

[51] Int. Cl.³ .............................................. B60B 7/04
[52] U.S. Cl. ............................... 301/37 SS; 301/37 P
[58] Field of Search ................ 301/37 P, 37 R, 37 SS

[56] References Cited

U.S. PATENT DOCUMENTS

| | | | |
|---|---|---|---|
| 2,709,114 | 5/1955 | Plotkin | 301/37 SS |
| 2,713,514 | 7/1955 | Lyon | 301/37 SS |
| 2,713,516 | 7/1955 | Lyon | 301/37 SS |
| 3,145,062 | 8/1964 | Judd | 301/37 SS |
| 4,166,653 | 9/1979 | Claucherty | 301/37 SS |
| 4,275,930 | 6/1981 | Kamihama | 301/37 SS |

Primary Examiner—Charles A. Marmor
Attorney, Agent, or Firm—Neal A. Waldrop; Jay C. Taylor

[57] ABSTRACT

A cover of moulded plastics material for fitting to a pressed steel motor car wheel to simulate in a realistic manner a wire spoked wheel comprises two separate, but individually integral, injection mouldings 1, 2 of plastics material. The part 1 comprises an inner hub part 3, an inner rim part 5 and a series of spokes 8 extending between and integrally moulded with the parts 3 and 5. The other part 2 comprises a hub part 11, a rim part 12 and a series of spokes 15 extending between and integrally moulded with the parts 11 and 12. Owing to the moulding of the cover in two separate parts which fit together co-axially, it is possible to make the cover with the spokes 8 and 15 lying in a number of axially separated planes while still forming the moulds from the which the parts 1 and 2 are produced in such a way that there are no undercuts and the mouldings can easily be removed from the moulds. The axial separation of the spokes provides the cover with a much more realistic appearance than is possible with all the spokes lying in a single plane, which is the only practical way in which the covers can be made if they consist of a single moulding.

11 Claims, 2 Drawing Figures

COVERS FOR THE WHEELS OF MOTOR CARS

This application is a continuation, of application Ser. No. 232,149, filed Feb. 6, 1981, now abandoned.

Most motor car wheels are made as steel pressings and comprise a hub and a rim with an annular web, which is dished so that it is concave towards the outside of the wheel, extending between and integral with, or welded to, the hub and the rim.

More expensive wheels, which are generally only fitted to high performance cars, are integral castings of light alloy, and other wheels, which are also generally only fitted to high performance cars, are still made in a manner which was common many years ago and consist of a hub and a rim with wire spokes extending between them.

It is considered in some circles that cast alloy or wire spoked wheels enhance the appearance of a car and accordingly wheel covers which simulate the appearance of such wheels, but which are made of moulded plastics material, are available. These covers are made so that they can be push-fitted in a simple manner to pressed steel wheels and then make the wheels appear, at least at a glance, that they are of cast alloy or are wire spoked. The covers have a rim which fits within the rim of the pressed steel wheel and which carries a number of metal clips which grip the wheel rim frictionally to hold the cover in place, the cover covering the annular web and usually also the hub and the rim of the wheel.

It is a comparatively simple matter to make covers which simulate cast alloy wheels by injection moulding, but it has not so far proved possible to make a cover which simulates a wire spoked wheel, and which has a realistic appearance, by injection moulding out of plastics material. This is because the spokes of a wire spoked wheel diverge axially from the rim to the hub so that the spokes lie on two different substantially conical surfaces. This axial divergence of the spokes is necessary to enable the wheel to withstand an axial thrust.

The simulated wire spoked wheel covers which have so far been made have also been produced as a single injection moulding of plastics material, but to enable the mould in which the covers are made to be separable, all the spokes have extended along a single flat or substantially conical surface and their appearance therefore is not at all realistic except upon the most fleeting inspection.

The aim of the present invention is to provide a wheel cover of moulded plastics material for fitting to a pressed steel motor car wheel to simulate a wire spoked wheel, the wheel cover having its simulated wire spokes arranged in such a way that the appearance of the cover simulates a wire spoked wheel far more realistically than has previously been the case.

To this end, according to this invention, such a wheel cover comprises two separate, but individually integral, injection mouldings of plastics material, one of which forms an inner cover part and the other of which forms an outer cover part, each of the parts comprising a rim part, a hub part and a series of simulated wire spokes extending between the rim part and the hub part, the rim parts being arranged to fit together co-axially and both to fit within the rim of a pressed steel wheel and the hub parts being arranged to fit together co-axially with the inner hub part adjacent the hub of the wheel and the outer hub part surrounding the inner hub part and the spokes of the two parts being axially separated from each other when the parts are fitted together.

By moulding the cover in two separate parts in this way and subsequently fitting them together, it is possible to make both of the moulds, from which the two separate parts are produced, in such a way that the mould halves are readily separable from each other and the mouldings can easily be ejected from the mould. This is made possible by constructing the moulds so that their separation surfaces extend at least substantially along the longitudinal centre planes of the spokes so that half of each spoke is formed in each mould half and no undercuts are necessary in the mould halves to form the surfaces of the spokes. The provision of any undercuts would of course prevent removal of the moulded parts from the moulds.

Preferably, to improve the realism of the appearance of the cover, the spokes of each part are arranged in pairs and the spokes of each pair cross each other and touch each other and are integrally moulded at their crossing points. The fact that the spokes touch each other and are integrally moulded at their crossing points makes it still possible to form the mould halves without undercuts so that the moulded parts remain easily removable from the moulds.

When the spokes are arranged in crossing pairs in this way, preferably one end of the spokes of each pair of spokes lie in the same plane as each other perpendicular to the axis of the cover and the spokes of each pair diverge axially from each other so that the other ends of the spokes of each pair are axially separated from each other. In a preferred example, the radially inner ends of the spokes of the inner cover part all lie in the same plane perpendicular to the axis of the cover to each other and the outer ends of the spokes of each pair are axially separated. The radially outer ends of the spokes of the outer cover part also lie in the same plane perpendicular to the axis of the cover as each other and the inner ends of the spokes of each pair of the outer cover part are axially separated. It has been found that this arrangement gives a particularly effective appearance.

Preferably the rim part of the inner cover part is cylindrical and the rim part of the outer cover part is of J-shaped cross section with the leg of the J arranged to fit together with the cylindrical rim part of the inner cover part and the hook of the J extending outwards to cover the rim of the pressed steel wheel when the wheel cover is fitted in position.

The hub part of the inner cover part is preferably substantially saucer shaped and inwardly concave to enable it to fit entirely over the hub of the wheel when the cover is fitted in position. The axially outer part of the substantially saucer shaped hub part then preferably has a cylindrical wall and the hub part of the outer cover part has a cylindrical ring-shaped portion which fits closely around the cylindrical wall of the inner hub part.

The inner and outer cover parts may be permanently united by means of an adhesive or by making the two parts a tight push-fit together, but alternatively the two cover parts may be separable and in this case the rim part of the outer cover part is preferably provided with fastening portions which are a push-fit within the rim of the wheel. In this way, when the outer cover part is fitted to the wheel, it holds the inner cover part in position within it. The fastening portions are preferably in the form springy metal clips similar to those provided in conventional moulded plastics wheel covers which simulate cast light alloy wheels. The metal clips are fitted into sockets which are moulded in the rim part of the outer cover part.

An example of a wheel cover in accordance with the invention is illustrated in the accompanying drawings in which.

Figure 1:
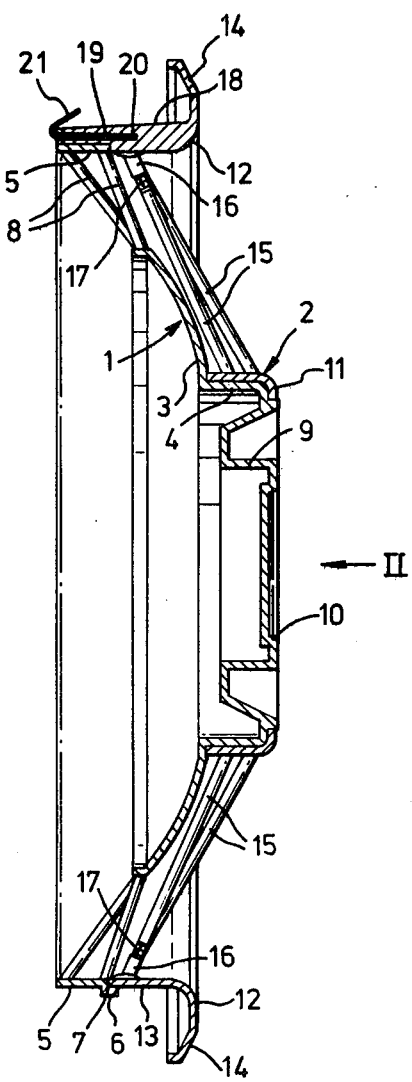
FIG. 1 is a diametric section through the cover.
Figure 2:
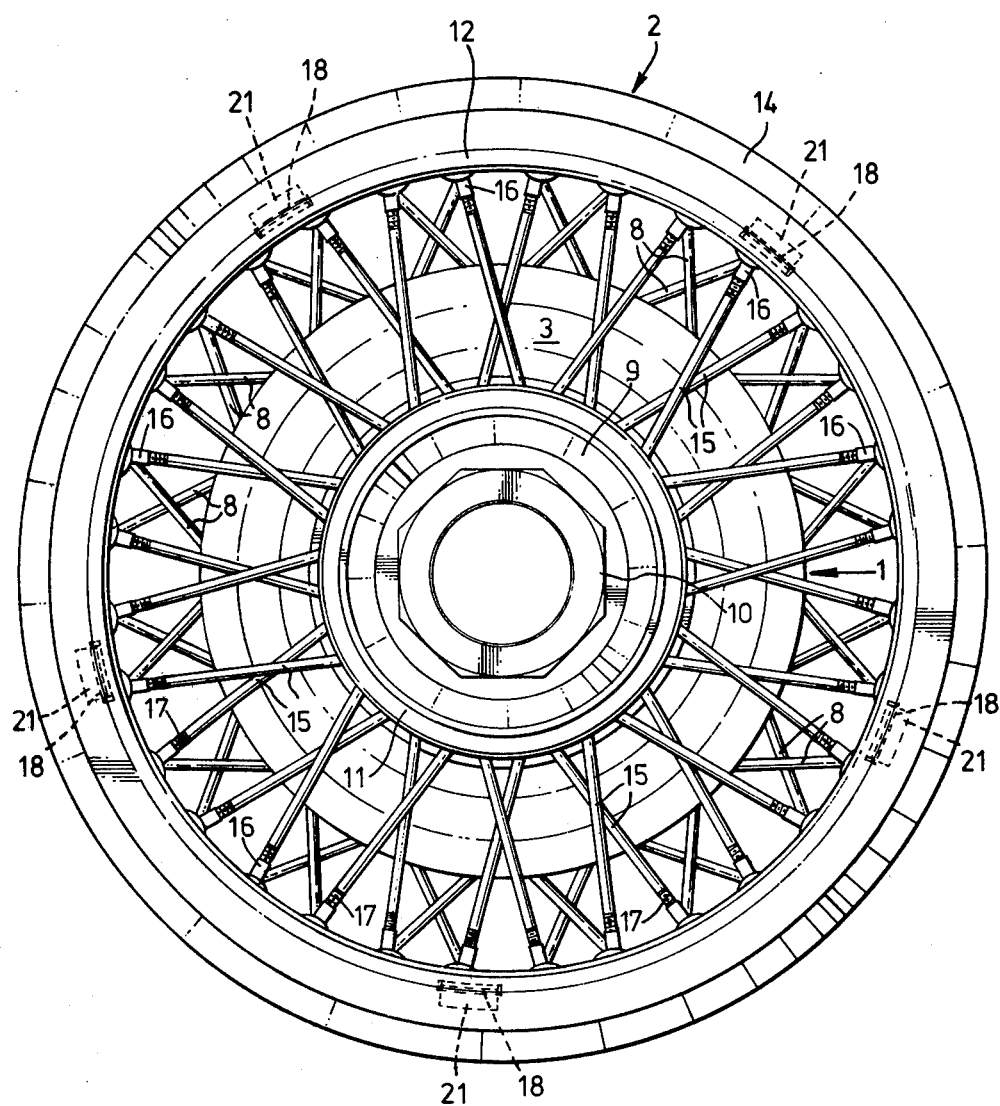
FIG. 2 is a front elevation of the cover as seen in the direction of the arrow II in FIG. 1.

The wheel cover comprises an inner cover part 1 and an outer cover part 2 which are fitted together co-axially. Each of the parts 1 and 2 is formed as a single injection moulding of ABS (acrylonitrile-butadiene-styrene), or high impact polystyrene. The inner cover part 1 has a saucer-shaped inner hub part 3, an axially outer part of which has a cylindrical wall 4. The inner cover part 1 also has a cylindrical inner rim part 5 with a radially outwardly offset flange 6 forming an annular rebate 7. Spokes 8 extend between and are integrally moulded with the hub part 3 and the rim part 5 and, as shown in FIG. 2, the spokes 8 are arranged in pairs with the spokes of each pair crossing each other. As is shown in FIG. 1, the radially inner ends of all of the spokes 8 lie in a common plane perpendicular to the axis of the cover and the spokes of each pair diverge axially from each other in a radial outward direction so that their outer ends are axially spaced from each other. However, where each pair of spokes 8 cross each other they touch each other and are integrally moulded with each other so that the mould halves from which the part 1 is moulded do not have any undercuts. The space bounded by the cylindrical wall 4 is filled by an integrally moulded wall portion 9 which, as shown most clearly in FIG. 2, is shaped to simulate a wheel fixing nut 10.

The outer cover part 2 has an outer hub part 11, which closely surrounds the cylindrical wall 4 of the inner hub part 3, and an outer rim part 12 which is of J-shaped cross-section and has a leg portion 13 and a hook portion 14. The free end of the leg portion 13 is a close push-fit in the annular rebate 7 formed in the inner rim portion 5. Thus both the hub portions and the rim portions of the two cover parts 1 and 2 fit tightly together.

A further series of spokes 15 extend between and are integrally moulded with the outer hub part 11 and the outer rim part 12. Each of the spokes 15 is formed at its outer end with a simulated nipple 16 and a simulated screw thread 17 to improve the realism of the appearance of the spokes. Similarly to the spokes 8, the spokes 15 are, as shown most clearly in FIG. 2, arranged in pairs which cross each other. The spokes of each pair diverge axially from each other, but, unlike the spokes 8, the radially outer ends of the spokes 15 all lie in the same plane perpendicular to the axis of the cover and the radially inner ends of each pair of the spokes 15 are axially spaced from each other where they join the outer hub part 11. Again, though, where each of the pairs of spokes 15 cross each other they touch each other and are integrally moulded with each other where they touch so that the mould can be made without any undercuts.

The leg portion 13 of the outer rim part 12 is provided with five outwardly projecting ribs 18 which are equally spaced angularly around the rim part 12. The ribs 18 are indicated in dotted lines in FIG. 2 and one of the ribs 18 is shown in radial section at the top of FIG. 1. Each of the ribs 18 is formed with a socket 19 in which a metal clip 20 is a push-fit. Each of the clips 20 has a leg portion which fits in the socket 19 and this leg portion has a tag which bites into the wall of the socket 19 and prevents the clip 20 from being withdrawn from the socket once it has been inserted. Each of the clips 20 also has a projecting springy hook-part 21.

The outer cover part 2 is moulded so that the circle circumscribing the radially outer edges of the ribs 18 is slightly smaller than the internal diameter of the rim of the pressed steel wheel to which the cover is to be fitted. The two parts of the cover are then assembled as shown in the drawings and the inner and outer rim parts 5 and 12 are pushed into the rim of the wheel. This causes the hook-parts 21 to be sprung inwards so that they are a tight fit within the rim of the wheel and any movement of the rim part 12 out of the rim of the wheel causes the tips of the hook-parts 21 to bite into the surface of the rim of the wheel and hold the outer cover part 2 in position. Since the inner cover part 1 fits axially within the outer cover part 2 within the rim of the wheel, the whole of the cover is thus held in position by the metal clips 21 with the inner hub part 3 extending over and covering the hub of the wheel. The inner saucer-shaped part of the inner hub part 3 either extends over and covers the drum of the brake if the wheel is fitted with drum brakes, or simulates a drum brake if the wheel to which the cover is fitted is provided with a disc brake.

The covers may be made in various sizes to fit various sizes of pressed steel wheel and in each case the cover is made so that the hook-shaped parts 21 of the metal clips are a very tight press fit in the rim of the wheel. When the cover is fitted to the wheel, the hook-shaped part 14 of the outer rim part 12 extends outwardly over the rim of the pressed steel wheel so that the wheel as a whole is covered by the cover and only a small portion of the annular web of the wheel is visible between the spokes 8.

Simulated wire spoke wheel covers with the spokes lying in axially separated planes are available, but these are formed as complex assemblies of metal parts and they are not only extremely expensive, but they are also very much heavier than the moulded plastics wheel cover in accordance with the present invention. The existing metal wheel covers weigh upwards of 3 kg each and they therefore add appreciably to the unsprung weight of the motor car to which they are fitted.

Injection moulded covers of plastics material in accordance with the present invention can be made very much more cheaply and, even more important, they are much lighter and for some wheels may weigh no more than 0.5 kg. The have the added advantage over metal wheel covers that they are not subject to corrosion.

Instead of producing the cover as two injection mouldings of plastics material, it may be made in the same manner but as two separate but individually integral metal diecastings. Diecasting in metal is of course a very similar operation to injection moulding in plastics material.

I claim:

1. A wheel cover of moulded material for fitting within the rim of an automobile wheel to simulate a wire spoked wheel, said wheel cover comprising an inner one-piece moulding and an outer one-piece moulding interfitting coaxially for insertion within said wheel rim, each one-piece moulding comprising a radially outer rim part, a central hub part, and an associated series of simulated wire spokes, each spoke having radially outer and inner ends joined respectively with the associated rim part and hub part as unitary moulded portions thereof, the series of spokes associated with said inner moulding comprising an inner series spaced axially inwardly from the series of spokes associated with said outer moulding and comprising an outer series, the spokes of both series being arranged in circumferentially spaced crossing pairs moulded together at the region of crossing, the ends of the spokes in each crossing pair joined with one of said parts of said inner moulding lying in a first inner plane perpendicular to the principal axis of said cover, the spokes in each last named crossing pair extending from said first inner plane and diverging axially from each other to ends joined with the other of said parts of said inner moulding in paired axially spaced inner planes parallel to and spaced axially from said first inner plane, the end of one spoke in each crossing pair joined with said other of the inner moulding parts lying in one of said paired axially spaced inner planes, and the end of the other spoke in each crossing pair joined with said other of the inner moulding parts lying in the other of said paired axially spaced inner planes, the ends of the spokes in each crossing pair joined with one of the parts of said outer moulding lying in a first outer plane parallel to said first inner plane, the spokes in each last named crossing pair extending from said first outer plane and diverging from each other to ends joined with the other of said parts of said outer moulding at paired axially spaced outer planes parallel to and spaced axially from said first outer plane, the end of one spoke in each crossing pair joined with said other of the outer moulding parts lying in one of said paired axially spaced outer planes, and the end of the other spoked in each crossing pair joined with said other of the outer moulding parts lying in the other of said paired axially spaced outer planes, said rim parts of said inner and outer mouldings interfitting coaxially, the spokes associated with said rim parts having radially outer ends joined with said rim parts at a common cylindrical surface, the hub part of said outer moulding comprising a coaxial annular hub part having the radially inner ends of the associated spokes joined thereto, said hub part of said inner moulding comprising an annular wall extending coaxially within said annular hub part of said outer moulding, the latter annular hub part and said annular wall closely engaging each other in mutually supporting relationship.

2. A wheel cover according to claim 1, means for limiting axial outward movement of said inner moulding with respect to said outer moulding comprising axially interengaging portions of said annular hub part and said annular wall, and also comprising axially interengaging portions of the rim parts of said outer and inner mouldings, and retention means on said rim part of said outer moulding for detachably securing the latter rim part to a vehicle wheel rim.

3. A wheel cover according to claim 2, said hub part of said inner moulding also comprising an annular saucer shaped portion extending radially outwardly and axially inwardly from the axially inner end of said annular wall and terminating in an outer peripheral hub portion located radially near the mid region between said hub and rim parts of said outer moulding, the spokes associated with said inner moulding having radially inner ends joined with said peripheral hub portion.

4. A wheel cover according to claim 3, said retention means comprising a plurality of axially inwardly projecting ribs of the rim part of said outer moulding, said ribs closely engaging the outer periphery of the rim part of said inner moulding in mutually supporting relationship, and spring clip means carried by said ribs for resiliently engaging a vehicle wheel rim.

5. A wheel cover according to claim 1, said one part of said outer moulding comprising said rim part thereof and being spaced axially inwardly of said annular wall of said inner moulding, said one part of said inner moulding comprising said hub part thereof and being spaced axially outwardly of said rim part of said inner moulding, and said first inner plane being axially inwardly of said hub part of said outer moulding.

6. A wheel cover according to claim 3, said one part of said outer moulding comprising said rim part of said outer moulding, said first outer plane being spaced axially inwardly of said annular wall of said inner moulding, said annular peripheral hub portion of said saucer shaped portion and being spaced axially outwardly of said rim part of said inner moulding and axially inwardly of said hub part of said outer moulding.

7. A wheel cover according to claim 6, said retention means comprising a plurality of axially inwardly projecting ribs of the rim part of said outer moulding, said ribs closely engaging the outer periphery of the rim part of said inner moulding in mutually supporting relationship, and spring clip means carried by said ribs for resiliently engaging a vehicle wheel rim.

8. A wheel cover of moulded material for fitting within the rim of an automobile wheel to simulate a wire spoked wheel, said wheel cover comprising an inner one-piece moulding and an outer one-piece moulding interfitting coaxially for insertion within said wheel rim, each one-piece moulding comprising a radially outer rim part, a central hub part, and an associated series of simulated wire spokes, each spoke having radially outer and inner ends joined respectively with the associated rim part and hub part as unitary moulded portions thereof, the series of spokes associated with said inner moulding comprising an inner series spaced axially inwardly from the series of spokes associated with said outer moulding and comprising an outer series, the spokes of both series being arranged in circumferentially spaced crossing pairs moulded together at the region of crossing, the ends of the spokes in each crossing pair joined with one of said parts of said inner moulding lying in a first inner plane perpendicular to the principal axis of said cover, the spokes in each last named crossing pair extending from said first inner plane and diverging axially from each other to ends joined with the other of said parts of said inner moulding in paired axially spaced inner planes parallel to and spaced axially from said first inner plane, the end of one spoke in each crossing pair joined with said other of the inner moulding parts lying in one of said paired axially spaced inner planes, and the end of the other spoke in each crossing pair joined with said other of the inner moulding parts lying in the other of said paired axially spaced inner planes, the ends of the spokes in each crossing pair joined with one of the parts of said outer moulding lying in a first outer plane parallel to said first inner plane, the spokes in each last named crossing pair extending from said first outer plane and diverging axially from each other to ends joined with the other of said parts of said outer moulding at paired axially spaced outer planes parallel to and spaced axially from said first outer plane, the end of one spoke in each crossing pair joined with said other of the outer moulding parts lying in one of said paired axially spaced outer planes, and the end of the other spoke in each crossing pair joined with said other of the outer moulding parts lying in the other of said paired axially spaced outer planes, one spoke in each of said crossing pairs associated with said outer moulding having an end lying in the same one of said paired axially spaced outer planes, the other spoke in each of said last defined crossing pairs having an end lying in the other of said paired axially spaced outer planes, said one spoke in the circumferentially adjacent last defined pairs crossing the paired spoke in circumferentially opposite directions, similarly one spoke in each of said crossing pairs associated with said inner moulding having an end lying in the same one of said paired axially spaced inner planes, the other spoke in each of the last defined crossing pairs having an end lying in the other of said paired axially spaced inner planes, said one spoke in the circumferentially adjacent last defined pairs crossing the paired spoke in circumferentially opposite directions.

9. A wheel cover according to claim 8, said one spoke in the circumferentially adjacent crossing pairs of spokes comprising mirror images of each other.

10. A wheel cover according to claim 9, the spokes in each series having ends joined to the associated part at locations spaced substantially uniformly around the periphery of the associated part.

11. A wheel cover according to claim 9, the spokes associated with said outer moulding having their radially outer ends joined with the associated rim part in said first outer plane and having their radially inner ends joined with the associated hub part in said outer axially spaced planes, the spokes associated with said inner moulding having their radially outer ends joined with the associated rim part in said inner axially spaced planes and having their radially inner ends joined with the associated hub part in said first inner plane.

* * * * *